United States Patent
MacKelvie

(10) Patent No.: US 9,174,284 B2
(45) Date of Patent: Nov. 3, 2015

(54) ROTARY BURRING TOOL

(71) Applicant: Winston MacKelvie, Knowlton (CA)

(72) Inventor: Winston MacKelvie, Knowlton (CA)

(73) Assignee: NUCAP INDUSTRIES, INC., Scarborough (CA)

(*) Notice: Subject to any disclaimer, the term of this patent is extended or adjusted under 35 U.S.C. 154(b) by 102 days.

(21) Appl. No.: 13/987,536

(22) Filed: Aug. 5, 2013

(65) Prior Publication Data

US 2015/0033929 A1    Feb. 5, 2015

(51) Int. Cl.
  *B23B 5/04* (2006.01)
  *B23B 51/04* (2006.01)
  *B26D 3/08* (2006.01)
  *B26D 3/06* (2006.01)

(52) U.S. Cl.
  CPC ......... *B23B 51/0413* (2013.01); *B23B 51/0406* (2013.01); *B26D 3/06* (2013.01); *B26D 3/085* (2013.01); *B23B 2251/54* (2013.01); *Y10T 83/0267* (2015.04)

(58) Field of Classification Search
  CPC  B23B 51/00; B23B 51/0018; B23B 51/0036; B23B 51/0063; B23B 51/0406; B23B 51/0413; B23B 51/0426; B23B 51/044; B23B 51/05; Y10T 83/0267; Y10T 83/9457; Y10T 83/9461; Y10T 83/9464; Y10T 408/895; Y10T 408/8957

USPC .................. 83/870, 698.11, 698.31, 698.41; 30/276, 279.2, 501, 504, 357; 408/204, 408/206, 703–705

See application file for complete search history.

(56) References Cited

U.S. PATENT DOCUMENTS

| | | | |
|---|---|---|---|
| 2001/0001276 A1* | 5/2001 | Chao | 408/204 |
| 2005/0042048 A1* | 2/2005 | Keightley | 408/204 |
| 2009/0035082 A1* | 2/2009 | Singh | 408/204 |
| 2009/0169317 A1* | 7/2009 | Rae | 408/204 |
| 2014/0023447 A1* | 1/2014 | Thom et al. | 408/204 |

* cited by examiner

*Primary Examiner* — Phong Nguyen
(74) *Attorney, Agent, or Firm* — Patterson & Sheridan, LLP

(57) ABSTRACT

A texturizing tool that creates concentric, circular patterns of burrs in the surface of a workpiece by graving, planning or plowing, curved stop-grooves each with a burr of the displaced material which remains securely attached to the workpiece. Toothed cylindrical saws having angled slots for a drive pin are concentrically assembled. When forced against the workpiece, each saw rotates some few degrees causing the teeth to cut the stop-grooves and making the burrs. The drive pin and a return spring are carried in a capped outer cylindrical actuator which the drive pin also passes through. The concentric saw's cutting teeth cut in opposite directions to cancel out the cutting forces on the workpiece. Articles so texturized may be used in structural adhesive bonding, and for embedment of texturized articles such as fasteners, washers, plates and the like, into molded plastic and composite structures while being molded.

9 Claims, 1 Drawing Sheet

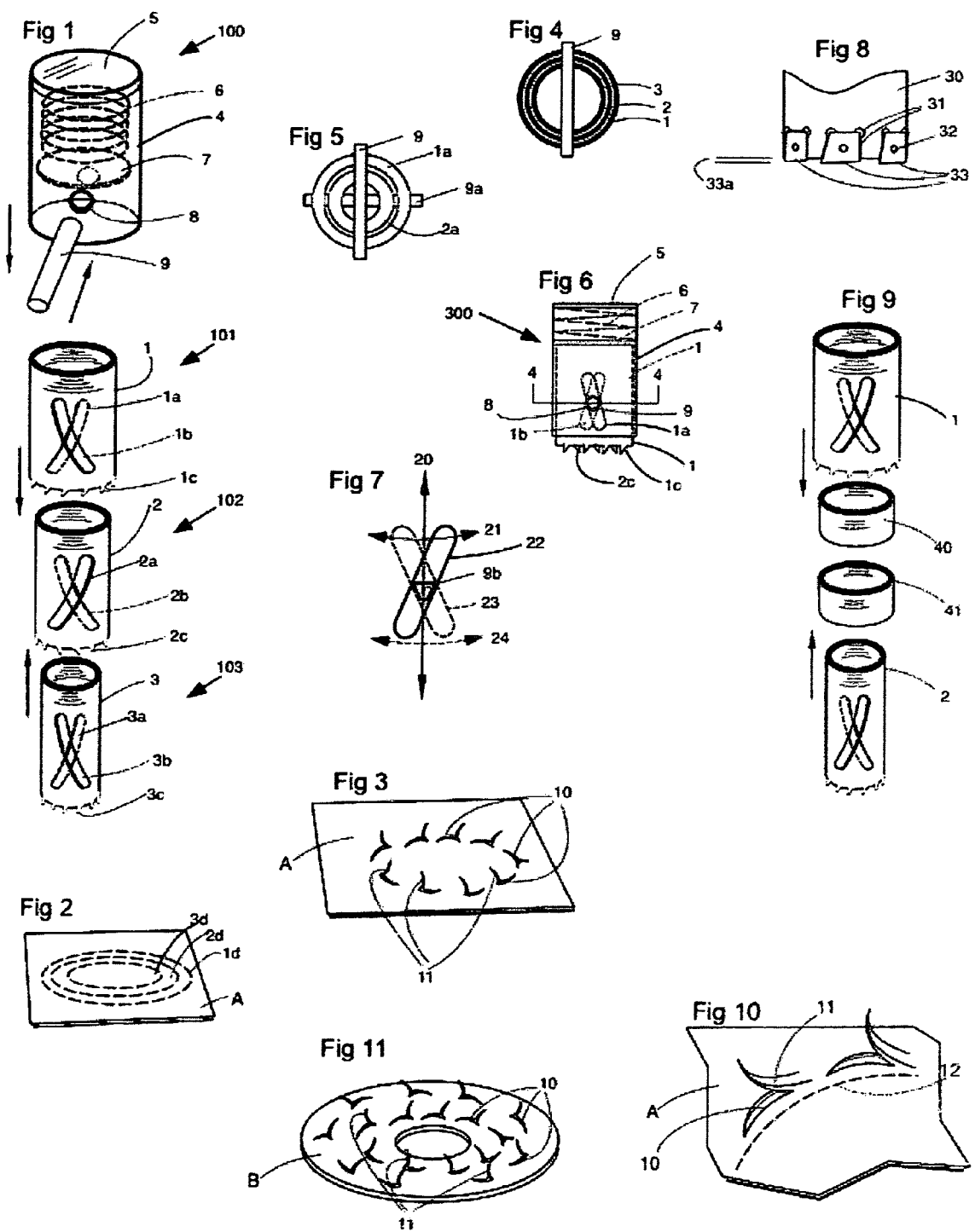

ROTARY BURRING TOOL

FIELD OF THE INVENTION

The instant invention is in the field of cutting tools.

BACKGROUND OF THE INVENTION

Textured surfaces provide advantages in joining objects together: Disclosed is a tool for texturizing surfaces.

SUMMARY OF THE INVENTION

Cylindrical saws, which are commonly known as "hole" saws, have a cylindrical body with a rim of teeth formed to cut in one direction of rotation. When pressed against a workpiece surface, the teeth cut a narrow ring groove and thereby produce small chips of severed groove material. The spinning hole saw eventually passes through the workpiece creating a hole and a plug.

In the instant tool, cylindrical saws of one length but with different diameters that enable the saws to be assembled concentrically. In this tool all the saws are made to rotate only a small fraction of a revolution with alternate saws rotating oppositely. Cutting teeth are therefore formed on the rims of alternate saws to cut in both clockwise and counterclockwise directions. With this tool no chips are produced but instead a ring of curved stop-grooves are plowed resulting in raised burrs which comprise the displaced material from the stop-grooves, one burr at one end of each curved groove.

The term stop-groove is used herein to distinguish the unique cutting action of the tool whereby the teeth move into the workpiece and travel a limited distance at which point cutting stops and the tool/teeth is retracted. Thus each curved stop-groove is cut or plowed and stopped before severing the burrs. The actual degrees of rotation of the tool's saws is a function of tooth spacing.

The cylindrical saws have angled slots through their cylindrical walls, the direction of the slot being appropriate for the cutting direction of the respective saw. Enclosing the upper portion of the saws is a closed-end cylindrical sleeve. A hole through the sleeve allows for a drive pin to be inserted through hole and through the angled slots of the saws. The sleeve also encloses a return spring which bears against a pressure disc which bears on the rim of the concentric saws.

In operation, the tool strokes against a workpiece which may be supported on an anvil. Various means of applying a downwards force, such as from the ram of a press or a hammer blow, is applied to the top of the tool for the down stroke. As the drive pin is forced down along the angled slots, the concentric saws are made to counter-rotate and the return spring is compressed so that when the downstroke force is released, the tool upstrokes automatically to its starting positions ready for another downstroke.

If needed, the saws may be held in precise concentric alignment by spacers, bushings, rings, dimples or other such well known arrangements.

The number of teeth on each saw, as well as the shape and width of the teeth's cutting tips may be varied and will affect the calculation to cancel out the cutting forces whereby the outer sleeve and workpiece do not rotate. Alternatively, an extended drive pin may be peripherally anchored to prevent tool rotation, or the sleeve may be anchored to the press's ram face. Cancelling of the cutting forces is very useful because it eliminates the need to clamp-unclamp the workpiece and/or prevent tool rotation, both of which may be difficult, slow or expensive in some circumstances.

Multiple such tools can be co-mounted in a die set to operate simultaneously and create placed rings of burrs across a workpiece.

The texturizing that results in concentric rings of raised burrs may be used to attach to another object which has a matching pattern of grooves cut into its surface. As an example a vehicular disc brake pad may have such burr rings on the steel backing plate while the friction pad may have the complementary grooves molded into its surface such that they can be adhesively joined with the burr-groove engagement providing a strong shear-proof connection.

Other applications for such an arrangement of raised burrs on a surface include bonding of dissimilar materials or materials with low surface energy (for example, polyethylene) using adhesives. The rings of burrs can act as a spot bond to reinforce other fastener systems such as rivets.

Because the resulting surface is very Velcro™ like, articles having a fibrous or web type structure such as window curtains or automobile trim can be removably attached to a burred surface.

Bonding a metal reinforcement to composite materials is yet another application where the metal can add certain advantages such as protection. For example, metal washers texturized with the tool can be used to protect holes in composite structures from fretting damage from bolt heads.

Because the instant tool is so easy to use (simply striking with a hammer), the tool is also portable for use in the field as well as being attached to fixed presses in factories and workshops. Use is also contemplated in repair work where adhesives and fillers offer a better joining method than traditional piercing required for screw, bolt and rivet fasteners.

BRIEF DESCRIPTION OF THE DRAWINGS

FIG. 1 shows an exploded view of all the components of a three-saw tool;

FIG. 2 is a representative drawing of concentric rings of stop-grooves and burrs;

FIG. 3 shows a detail of one ring of curved grooves and burrs;

FIG. 4 shows a cross section view at 4-4 (FIG. 6) where the rive pin extends through the sleeve and saws;

FIG. 5 shows how double drive pins can be used;

FIG. 6 is a side view showing the angled slots drive pin, return spring, pressure disc and alternating cutting tooth shapes;

FIG. 7 shows the relative movements of the drive pin and two saws, and how an angled drive pin can be used to increase wear resistance by offering more contact surface area;

FIG. 8 shows the use of replaceable cutting inserts such as carbide which are set in recessed pockets in thicker walled cylinders;

FIG. 9 is an exploded view of a two-saw tool with the replaceable bushings used to maintain precision alignment between the saws and provide free rotative action therebetween;

FIG. 10 shows detail of the curvilinear structure of two stop-grooves and their respective burrs;

FIG. 11 shows a product in the form of washer for bolts and nuts that has one side texturized for bonding to or embedment in a substrate.

DETAILED DESCRIPTION OF THE INVENTION

Referring to the drawings, for clarity of understanding they may show small gaps or spaces between components but in practice most components fit closely together as in normal machine tool design.

FIG. 1 shows how the major components 100, 101, 102, 103 assemble into burring tool 300 (FIG. 6). Three cylindrical saws 101, 102, 103 have cylindrical bodies 1, 2 and 3 respectively, each of a diameter that allows them to telescope together in concentric fashion (FIGS. 4 and 5). Each saw body 1, 2 and 3 has two angled slots 1a, 1b, 2a, 2b, 3a, 3b respectively, on diametrically opposite sides of the cylindrical body. All the slots align on assembly so as to define an opening for drive pin 9 to pass entirely therethrough. Rotary burring tool 30 preferably has at least two saws.

In FIG. 1, angled slots 1a, 1b and 3a, 3b are in the same radial direction while angled slot 2a, 2b are in the opposite direction. In this way, when the drive pin is forced down the slots, saws 101, 103 are displaced radially in the same direction (clockwise) while saw 102 is radially displaced in the opposite direction (counterclockwise). Saws 101, 102, 103 have cutting teeth 1c, 2c, 3c respectively, formed in their lower rims. FIGS. 1 and 6 show that the teeth have a direction of cut where teeth 1c and 3c cut in a clockwise direction and teeth 2c cut in opposite counterclockwise direction. These directions of course correlate with the slot's right or left angle from the vertical such that the teeth are driven in the appropriate cutting direction.

FIG. 2 illustrates how the saw's teeth cut stop-grooves in concentric rings 1d, 2d, 3d on workpiece A which causes burrs 11 (FIGS. 3 and 10) of displaced material to be raised while remaining attached thereto. FIG. 3 shows a single ring of stop-grooves and their related burrs on workpiece A. FIG. 10 shows an enlarged detail from a portion of a ring on a portion of workpiece A where the stop-grooves 10 follow a curved path 12 and the resulting displaced material from workpiece A results in raised burrs 11. In FIGS. 3, 10 and 11, the stop-groove 10 and resulting burr 11 are shown as having been created by V-pointed teeth. However, square and radius tipped teeth can also be used. The teeth may also be alternatively off-set so as to operate at slightly different radiuses from the saw's center.

In FIG. 1 is shown actuator 100 which comprises a cylindrical body shorter than the saws, with hole 8 for drive pin 9. Internal spring 6 and pressure disc 7 are held therein by cap 5. Actuator 100 receives saws 101, 102, 103 whose upper rims collectively bear on pressure disc 7 which, in turn, compress spring 6. When actuator 100 is stroked down by the force of a press's ram or by a hammer blow (shown by arrow 20), the drive pin forces the angled slots apart which results in the desired movement (21, 24) of the saws. When the force is released, the spring returns the saws to their starting position.

FIG. 4 shows a simplified sectional view 4-4 of the three saws and the drive pin arrangement. FIG. 5 shows how more than one drive pin can be used to distribute the load and lessen wear.

FIG. 7 shows just the slot and pin and the relative motions of operation for a single saw under action of force and return spring 20. Slots 22, 23 on one saw provide the same direction of radial motion 21, 24 of the saw.

FIG. 7 also shows how drive pin 9b can be advantageously shaped trapezoidally to provide much larger bearing surfaces to distribute operational forces over a larger area on the angled slots and pin to further reduce wear therebetween.

FIG. 6 is a side view showing the tool 300 and in particular how the teeth are formed on different saws to cut in opposite directions. In this way, the cutting forces of one saw can be counteracted by another, or by the net effect of multiple blades operating cooperatively. The torque applied to the saws by the drive pin is a function of the number of teeth, their cutting tips shape, and their radial distance from the tool's vertical center, as well as by the hardness of the workpiece.

By calculating the net torque values of saw operation in one direction (number of teeth multiplied by radius from tool center), the proper number of saws and teeth to be used in opposing directions can be determined. In this way, workpiece A need not be clamped while being texturized because the net torque acting on it is near zero.

FIG. 8 shows how replaceable teeth can be incorporated into the saws. Thick saw body 30 has multiple spaced pockets 31 formed in the wall. Inserts such as carbide inserts 33 are secured in the pockets by screws 32. The inserts 33 of course would have different directions of cut as per the above description. Tool 300 with inserts 33 can be expected to last much longer than saws with formed teeth, and being replaceable, will reduce the overall cost of texturizing particularly on harder materials. A depth of cut limiter 33a may be incorporated by designing for a particular amount of insert protrusion below lower rim of saw body 30.

FIG. 9 shows how one or two bushing 40, 41 can be incorporated between saws 1, 2 to provide the precision of operation that may be required in certain critical applications and to ensure long life with rebuild potential. Lower bushing can be retained in various ways known in the art including pins, dimples, circlips, etc. Upper bushing can ride on drive pin 9 or a single bushing with a through hole for the drive pin 9 is another option.

FIG. 11 shows a perspective of a texturized product in the form of a common washer B shown texturized with two rings of raised burrs on one face. If a second tool 300 were used below as the anvil (support) for the stroke of the top tool 300, then both faces of a workpiece, such as a washer, could be simultaneously texturized. Otherwise, if the anvil on which the workpiece sits while being texturized has ring grooves on its surface at the required spacing, the first texturized surface can be flipped over such that its ring of burrs locate in the anvil's ring grooves enabling the second side to be texturized while preserving the raised burrs on the first side. Threaded and bracketed plates to be embedded in molded products and hybrid assemblies of metal-polymer composites are also contemplated.

Although the invention has been shown and described with respect to detailed embodiments thereof, it should be understood by those skilled in the art that various changes in form and detail thereof may be made without departing from the spirit and scope of the invention.

I claim:
1. A rotary burring tool, comprising:
an actuator; and
at least two saws, including first and second saws, the saws being disposed in the actuator,
each saw having a cylindrical body having a vertical axis and a diameter, each saw having an upper rim and an annular lower cutting end, the cutting end comprising cutting teeth extending downward from the body, the saws being aligned concentrically so that they share the same vertical axis and the cutting teeth in all the saws are vertically aligned with each other,
the cutting teeth of the first saw being configured to cut into a surface adjacent to the teeth when the body of the first saw is subjected to a downward force while it rotates in a clockwise direction around the axis,
the cutting teeth of the second saw being configured to cut into a surface adjacent to the teeth when the body of the second saw is subjected to a downward force while it rotates in a counter-clockwise direction around the axis,
the actuator and saws being configured to allow them to move up and down together along the axis while con- straining the saws so that the cutting teeth in all the saws remain vertically aligned with each other as the saws move up and down, wherein when the actuator is activated, it causes the saws to move downward from a starting position to contact a workpiece, the first saw is made to rotate clockwise by a fraction of a revolution and the second saw is made to rotate counter-clockwise by the same fraction of a revolution.

2. The rotary burring tool of claim 1, wherein an inner surface of the actuator surrounds the saws and the actuator comprises a drive pin passing through or attached to opposing portions of the inner surface, the drive pin extending perpendicular to and through the axis, wherein the first saw comprises two slots spaced apart about the axis by 180 degrees, the slots being sized and aligned to allow the drive pin to pass through the slots, the slots being angled relative to the axis so that when the actuator is activated by being pressed downward bringing the saws into contact the workpiece, the drive pin continues to move downward along the axis and along the slots, causing the first saw to move downward and rotate clockwise, and wherein the second saw comprises two slots spaced apart about the axis by 180 degrees, the slots being sized and aligned to allow the drive pin to pass through the slots, the slots being angled relative to the axis so that when the actuator is activated by being pressed downward bringing the saws into contact the workpiece, the drive pin continues to move downward along the axis and along the slots, causing the second saw to move downward and rotate counter-clockwise.

3. The rotary burring tool of claim 2, wherein the actuator further comprises a biasing mechanism disposed in the actuator attached to the upper rims of the saws, wherein after the actuator has been activated by being pressed downward and the downward pressure is then removed, the biasing mechanism causes the actuator to move upward relative to the saws and the causes the saws to rotate back into the starting position.

4. The rotary burring tool of claim 2, wherein the actuator comprises a cylindrical body aligned concentrically with the saws, the actuator having a lower rim, the rotary burring tool being configured so that the lower rim of the actuator does not extend below the cutting teeth of the saws.

5. The rotary burring tool of claim 2, wherein the drive pin passes through holes in the inner surface of the actuator, the holes being spaced apart about the axis by 180 degrees.

6. The rotary burring tool of claim 1, further comprising a third saw.

7. The rotary burring tool of claim 6, wherein the diameter of the body of the first saw is greater than the diameter of the body of the second saw, the diameter of the body of the second saw is greater than the diameter of the body of the third saw, and the cutting teeth of the third saw are configured to cut into a surface adjacent to the teeth when the body of the third saw is subjected to a downward force while it rotates in the clockwise direction around the axis.

8. The rotary burring tool of claim 1, wherein the actuator and saw teeth are configured so that the fraction of a revolution traveled by the teeth is less than the distance between adjacent cutting teeth, so that when the cutting teeth are placed on a surface of a workpiece of ductile material, and the actuator is activated, each saw cuts a ring of non-overlapping gouges in the surface, causing a burr to be raised from each gouge with an end of the burr remaining attached to the surface.

9. The rotary burring tool of claim 1, wherein the saws are configured so that, when the cutting teeth are placed on a surface of a workpiece of ductile material, and the actuator is activated, then a resulting net torque acting on the workpiece because of the rotary burring tool is insignificant.

\* \* \* \* \*